(12) United States Patent
Babin

(10) Patent No.: US 10,747,031 B2
(45) Date of Patent: Aug. 18, 2020

(54) METHOD AND SYSTEM FOR OPTICAL PHASE MODULATION WITH REDUCED HARMONIC CONTENT

(71) Applicant: TeraXion Inc., Québec (CA)

(72) Inventor: André Babin, Québec (CA)

(73) Assignee: TeraXion Inc., Québec (CA)

( * ) Notice: Subject to any disclaimer, the term of this patent is extended or adjusted under 35 U.S.C. 154(b) by 0 days.

(21) Appl. No.: 16/521,107

(22) Filed: Jul. 24, 2019

(65) Prior Publication Data

US 2020/0050027 A1     Feb. 13, 2020

Related U.S. Application Data

(60) Provisional application No. 62/715,371, filed on Aug. 7, 2018.

(51) Int. Cl.
*G02F 1/03* (2006.01)
*G02F 1/035* (2006.01)
*G02F 1/01* (2006.01)

(52) U.S. Cl.
CPC ............ *G02F 1/035* (2013.01); *G02F 1/0147* (2013.01); *G02F 2203/50* (2013.01)

(58) Field of Classification Search
CPC ..... G02F 1/035; G02F 1/0147; G02F 2203/50
USPC .......................................................... 385/3
See application file for complete search history.

(56) References Cited

U.S. PATENT DOCUMENTS

| 5,073,331 | A  |         | 12/1991 | Shirasaki |
|-----------|----|---------|---------|-----------|
| 5,459,575 | A  |         | 10/1995 | Malvern   |
| 5,465,149 | A  |         | 11/1995 | Strandjord et al. |
| 6,741,763 | B1 | *       | 5/2004  | Taylor ....................... G02F 1/01 359/237 |
| 7,855,789 | B2 |         | 12/2010 | Strandjord et al. |
| 7,933,020 | B1 |         | 4/2011  | Strandjord et al. |

(Continued)

OTHER PUBLICATIONS

Poulin, et al. "Compact narrow linewidth semiconductor laser module", Proc. of SPIE vol. 7325, 73250O-1, 2009, Downloaded From: http://proceedings.spiedigitallibrary.org/ on May 12, 2015 Terms of Use: http://spiedl.org/terms.

(Continued)

*Primary Examiner* — Jerry M Blevins
(74) *Attorney, Agent, or Firm* — Hamilton, Brook, Smith & Reynolds, P.C.

(57) ABSTRACT

An optical phase modulation device for modulating a phase of an input light signal at a modulation frequency is provided, which can be used in integrated photonics applications. The device can include an optical phase modulator, for example a thermo-optic phase shifter having an effective refractive index that depends linearly temperature, configured to impart a phase shift to the input light signal, the phase shift varying quadratically in response to an applied modulating electric drive signal. The device can also include a phase modulator driver configured to apply the electric drive signal to the optical phase modulator, the electric drive signal having a time-varying component oscillating at half the modulation frequency and no time-constant component, thereby imparting the phase shift, modulated at the modulation frequency, to the phase of the input light signal to produce a phase-modulated light signal. Optical phase modulation systems and methods are also disclosed.

26 Claims, 7 Drawing Sheets

(56) References Cited

U.S. PATENT DOCUMENTS

| | | |
|---|---|---|
| 8,923,352 B2 | 12/2014 | Strandjord et al. |
| 8,947,671 B2 | 2/2015 | Strandjord et al. |
| 9,115,994 B2 | 8/2015 | Strandjord et al. |
| 9,121,708 B1 | 9/2015 | Qiu |
| 9,587,045 B2 | 3/2017 | Kropf et al. |
| 10,197,397 B2 | 2/2019 | Sanders et al. |
| 2014/0225476 A1 | 8/2014 | Degertekin et al. |
| 2019/0004342 A1* | 1/2019 | Iida .................. G02F 1/0147 |

OTHER PUBLICATIONS

Satir et al., "Harmonic Reduction in Capacitive Micromachined Ultrasonic Transducers by Gap Feedback Linearization", EEE Trans Ultrason Ferroelectr Freq Control, Jan. 2012; 59(1): 50-59, doi: 10.1109/TUFFC.

Poulin et al., "Low Noise Semiconductor Laser for Optical Fiber Sensing", Proc. of SPIE vol. 7503, 75037M-1, 2009, Downloaded From: http://proceedings.spiedigitallibrary.org/ on Jun. 20, 2016 Terms of Use: http://spiedigitallibrary.org/ss/TermsOfUse.aspx.

Satir et al., "Phase and Amplitude Modulation Methods for Non-linear Ultrasound Imaging with CMUTs", IEEE Trans Ultrason Ferroelectr Freq Control, Aug. 2016; 63(8): 1086-1092, doi:10. 1109/TUFFC. 2016.2557621.

Ayotte et al., "Silicon Photonics-Based Laser System for High Performance Fiber Sensing", Proc. of SPIE vol. 9634, 963413-1, Downloaded From: http://proceedings.spiedigitallibrary.org/ on Oct. 10, 2015 Terms of Use: http://spiedigitallibrary.org/ss/TermsOfUse. aspx.

* cited by examiner

METHOD AND SYSTEM FOR OPTICAL PHASE MODULATION WITH REDUCED HARMONIC CONTENT

RELATED APPLICATION

This application claims the benefit of U.S. Provisional Patent Application No. 62/715,371 filed on Aug. 7, 2018. The entire teachings of the above application are incorporated herein by reference.

TECHNICAL FIELD

The technical field generally relates to the field of optics, and more particularly, to optical phase modulation methods and systems.

BACKGROUND

Optical phase modulation is employed to control the phase of a light signal in a wide range of telecommunication and sensing applications. Non-limiting fields of application include coherent optical communications using, for example, the phase-shift key (PSK) modulation format or its derivatives; fiber optics and integrated photonics; fiber optic gyroscope sensors and other interferometric-based sensors; lidar and other optical remote sensing techniques; and active mode locking of lasers. Common types of phase modulators are thermo-optic and electro-optic phase modulators, which achieve phase modulation of a light signal via, respectively, thermally and electrically controlled changes in the refractive index of the medium in which the light signal travels. While these types of optical phase modulators have proven useful in some applications, they also have some drawbacks and limitations, for example in terms of achieving control over the harmonic content of the phase-modulated signal. Challenges therefore remain in the field of optical phase modulation.

SUMMARY

The present description generally relates to techniques for modulating the phase of an input light signal at a desired modulation frequency to produce a phase-modulated light signal with reduced harmonic content, particularly in terms of the second harmonic at twice the desired modulation frequency. The control over the harmonic content of the phase-modulated light signal can be achieved by driving the optical phase modulator with a modulating electric drive signal having a time-domain waveform with certain characteristics.

In some implementations, the present techniques can be used in silicon-based photonic integrated circuits or other types of planar lightwave circuits. In other implementations, the present techniques can be used in optical fiber communication systems. In yet other implementations, the present techniques can be implemented in phase modulators used for laser frequency stabilization.

In accordance with another aspect, there is provided an optical phase modulation device for modulating a phase of an input light signal at a modulation frequency, the optical phase modulation device including:
an optical phase modulator including:
a modulating waveguide section for receiving and supporting propagation of the input light signal, the modulating waveguide section having an effective refractive index that depends linearly on temperature; and
a resistive heater in thermal contact with the modulating waveguide section; and
a phase modulator driver configured to apply a drive voltage or electric current having a time-varying component oscillating at half the modulation frequency and no time-constant component to the resistive heater to generate heat that is transferred into the modulating waveguide section, thereby changing the effective refractive index, and in turn, the phase of the input light signal propagating therealong to produce a phase-modulated light signal modulated at the modulation frequency.

In accordance with another aspect, there is provided an optical phase modulation device for modulating a phase of an input light signal at a modulation frequency, the optical phase modulation device including:
an optical phase modulator configured to receive and impart a phase shift to the input light signal, the phase shift varying quadratically with an applied drive voltage or electric current; and
a phase modulator driver configured to apply the drive voltage or electric current to the optical phase modulator as an electric drive signal having a time-varying component oscillating at half the modulation frequency and no time-constant component, thereby imparting the phase shift, modulated at the modulation frequency, to the phase of the input light signal to produce a phase-modulated light signal.

In accordance with another aspect, there is provided an optical phase modulation system, including:
a light source assembly configured to emit an input light signal;
an optical phase modulator including:
a modulating waveguide section for receiving and supporting propagation of the input light signal, the modulating waveguide section having an effective refractive index that depends linearly on temperature; and
a resistive heater in thermal contact with the modulating waveguide section; and
a phase modulator driver configured to apply a drive voltage or electric current having a time-varying component oscillating at half the modulation frequency and no time-constant component to the resistive heater to generate heat that is transferred into the modulating waveguide section, thereby changing the effective refractive index, and in turn, the phase of the input light signal propagating therealong to produce a phase-modulated light signal modulated at the modulation frequency.

In accordance with another aspect, there is provided an optical phase modulation system, including:
a light source assembly configured to emit an input light signal;
an optical phase modulator configured to receive the input light signal and to impart a phase shift to the input light signal, the phase shift varying quadratically with an applied drive voltage or electric current; and
a phase modulator driver configured to apply the drive voltage or electric current to the optical phase modulator as an electric drive signal having a time-varying component oscillating at half the modulation frequency and no time constant component, thereby imparting the phase shift, modulated at the modulation frequency, to the phase of the input light signal to produce a phase-modulated light signal.

In some implementations, the optical phase modulation system can include more than one light source defining the light source assembly. For example, in one embodiment, the light source assembly can include a master laser and one or more slave lasers implemented as a multifrequency laser source assembly provided in an integrated photonics platform. In such a case, the optical phase modulator can be provided in the output path of the master laser or the slave laser(s) to produce a phase-modulated output signal. For example, the optical phase modulator can be provided in the path used to distribute the master laser signal to the optical phase-locked loop (OPLL) of the slave laser(s). When the OPLL has a large amount of gain at the common modulation frequency, the present techniques can allow generating slave-laser output signals having substantially the same phase modulation as the master output signal. In some applications, such a multifrequency laser source assembly can be part of a fiber optic gyroscope or a phase-modulated RF-over-fiber link with interferometric detection.

In accordance with another aspect, there is provided an optical phase modulator for phase-modulating an input light signal at a modulation frequency, the optical phase modulator having a phase modulation function that depends quadratically on an applied drive voltage or electric current, and being configured, upon the applied drive voltage or electric current being provided as an electric drive signal having a time-varying component oscillating at half the modulation frequency and no time-constant component, to produce, from the input light signal, a phase-modulated light signal modulated at the modulation frequency in accordance with the phase modulation function.

In some implementations, the optical phase modulator is a thermo-optic phase shifter configured to modulate the input light signal based on the thermo-optic effect, according to which a change in temperature results in a change in the refractive index of the optical guiding medium in which the input light signal travels as it passes through the thermo-optic phase shifter. The change in refractive index induces a change in the phase of the input light signal, which produces the phase-modulated light signal. In such implementations, the electric drive signal—that is, the drive voltage or electric current—applied to the thermo-optic phase shifter by the phase modulator driver generates heat, predominantly by Joule heating. The heat thus generated is delivered to the thermo-optic phase shifter, changes its temperature, and induces, via the thermo-optic effect, a corresponding change in the refractive index of the thermo-optic material forming the optical guiding medium. In Joule heating, the temperature change experienced by the optical guiding medium is proportional to the square of the drive voltage or electric current applied by the phase modulator driver.

In some implementations, the thermo-optic phase shifter includes:
 a modulating waveguide section for supporting propagation of an input light signal, the modulating waveguide section having an effective refractive index that depends linearly on temperature; and
 a resistive heater in thermal contact with the modulating waveguide section, the resistive heater being configured, upon being supplied with a drive voltage or electric current having a time-varying component oscillating at half the modulation frequency and no time-constant component, to generate heat that is transferred into the modulating waveguide section, thereby changing the effective refractive index, and in turn, the phase of the input light signal propagating therealong to produce a phase-modulated light signal modulated at the modulation frequency.

In some implementations, the optical phase modulator is embodied by an electro-optic phase shifter. The electro-optic phase-shifter can be configured to modulate the input light signal based on a quadratic electro-optic effect, for example the Kerr electro-optic effect, according to which a change in the refractive index of the optical guiding medium in which the input light signal travels as it passes through the thermo-optic phase shifter is proportional to the square of an applied electric field.

In addition to thermo-optic and electro-optic phase shifters, the present techniques may, in principle, be implemented with or in any suitable type of electrically drivable phase modulator whose phase modulation function depends linearly on the square of the drive voltage or electric current, or equivalently, linearly on the electric power input supplied by the phase modulator driver.

In some implementations, more than one optical phase modulator may be provided in cascade, each applying a phase shift to the light signal passing therethrough, thereby adding a combined phase shift to the input light signal that produces a desired phase-modulated light signal. In other implementations, the present techniques may additionally or alternatively be configured so that the light signal makes more than one pass through one or more optical phase modulators.

In accordance with an aspect, there is provided a method of modulating a phase of an input light signal at a modulation frequency, the method including:
 receiving the input light signal in an optical phase modulator configured to impart a phase shift to the input light signal, the phase shift varying quadratically with an applied drive voltage or electric current; and
 applying the drive voltage or electric current to the optical phase modulator as an electric drive signal, the electric drive signal having a time-varying component oscillating at half the modulation frequency and no time-constant component, thereby imparting the phase shift, modulated at the modulation frequency, to the phase of the input light signal to produce a phase-modulated light signal.

In some implementations, the electric drive signal is a bipolar sinusoidal signal with no direct current (dc) offset. In such a case, the phase-modulated light signal is phase modulated sinusoidally with respect to the input light signal. However, electric drive signals having non-sinusoidal, periodic or quasi-periodic, time-domain waveforms may be used in other implementations.

In accordance with another aspect, there is provided a method of modulating a phase of an input light signal at a modulation frequency, the method including:
 propagating the input light signal along a modulating waveguide section having an effective refractive index that depends linearly on temperature; and
 applying a drive voltage or electric current having a time-varying component oscillating at half the modulation frequency and no constant component to a resistive heater in thermal contact with the modulating waveguide section, thereby generating heat to change the effective refractive index of the modulating waveguide section, and in turn, the phase of the input light signal propagating therealong to produce a phase-modulated light signal modulated at the modulation frequency.

In accordance with another aspect, there is provided a method of modulating a phase of an input light signal at a modulation frequency, the method including:

propagating the input light signal along a modulating waveguide section having an effective refractive index that depends linearly on temperature;
    applying a drive voltage or electric current having a time-varying component oscillating at half the modulation frequency and no time-constant component to a resistive heater to generate heat; and
    providing thermal contact between the resistive heater and the modulating waveguide section to change, with the heat generated by the resistive heater, the effective refractive index of the modulating waveguide section, and in turn, the phase of the input light signal propagating therealong to produce a phase-modulated light signal modulated at the modulation frequency.

It is to be noted that other method and process steps may be performed prior to, during or after the steps described herein. The order of one or more steps may also differ, and some of the steps may be omitted, repeated and/or combined, depending on the application.

Other objects, features and advantages of the present description will become more apparent upon reading of the following non-restrictive description of specific embodiments thereof, given by way of example only with reference to the appended drawings. Although specific features described in the above summary and in the detailed description below may be described with respect to specific embodiments or aspects, it should be noted that these specific features can be combined with one another unless stated otherwise.

DETAILED DESCRIPTION

Figure 1:
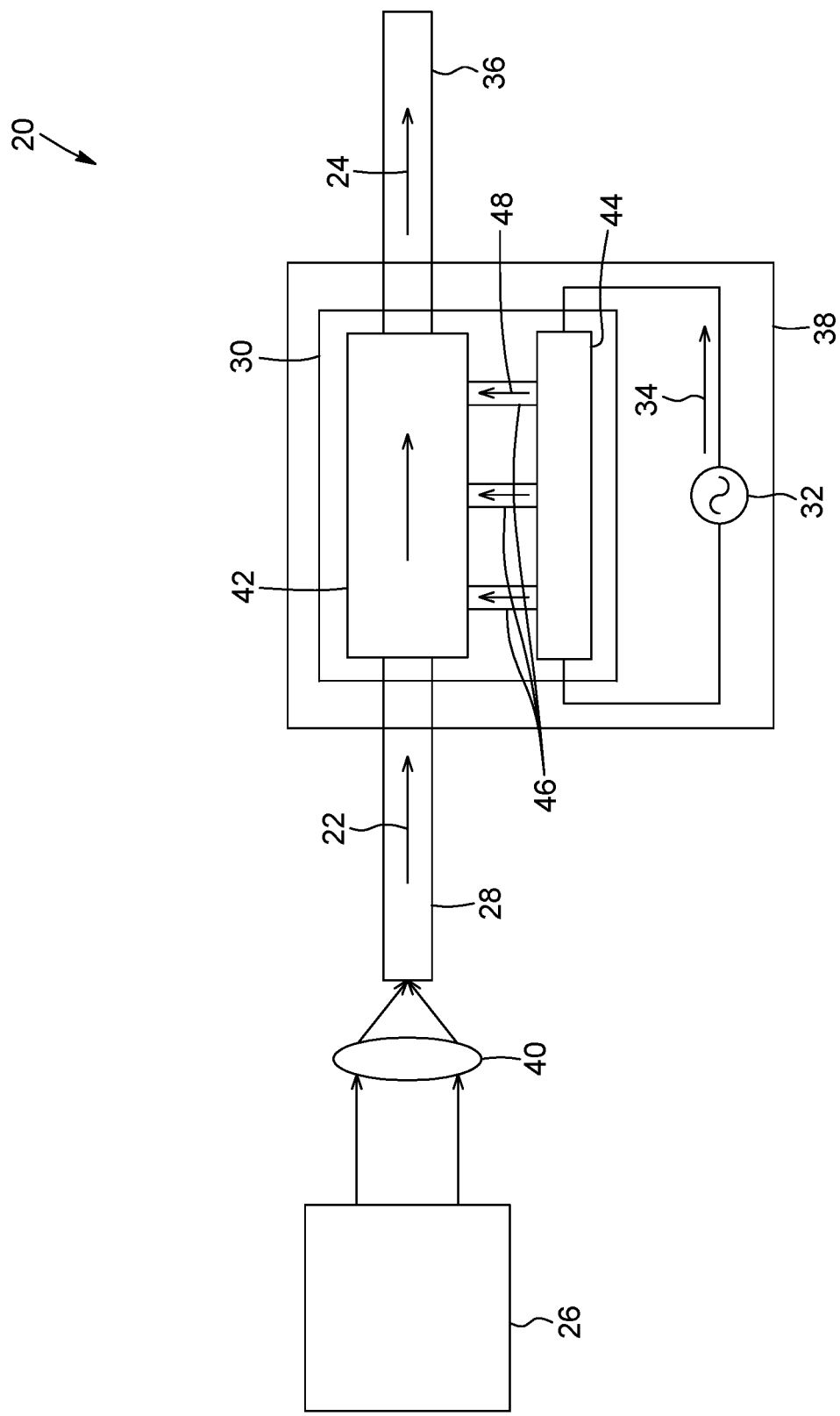
FIG. 1 is a schematic representation of an optical phase modulation system, in accordance with a possible embodiment.

In the present description, similar features in the drawings have been given similar reference numerals. To avoid cluttering certain figures, some elements may not be indicated if they were already identified in a preceding figure. It is appreciated that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. It will be understood that such spatially relative terms are intended to encompass different orientations in the use or operation of the present embodiments, in addition to the orientations exemplified in the figures.

Unless stated otherwise, the terms "connected", "coupled", and derivatives and variants thereof, refer to any connection or coupling, either direct or indirect, between two or more elements. The connection or coupling between the elements may be, for example, mechanical, optical, electrical, thermal, logical, or a combination thereof.

In the present description, the terms "a", "an" and "one" are defined to mean "at least one", that is, these terms do not exclude a plural number of items, unless stated otherwise.

Terms such as "substantially", "generally", "about", and "nearly", that modify a value, condition or characteristic of a feature of an exemplary embodiment, should be understood to mean that the value, condition or characteristic is defined within tolerances that are acceptable for the proper operation of this exemplary embodiment for its intended application.

The terms "linear dependence" and "quadratic dependence", and derivatives and variants thereof, when referring to the relationship between two quantities, are meant to encompass not only exact or strict linear and quadratic dependencies, but also generally, substantially, approximately, nearly or sufficiently linear and quadratic dependencies. The terms "linear dependence" and "quadratic dependence" are therefore intended to cover scenarios where the relationship between a first quantity and a second quantity can be considered "linear" or "quadratic", to a given tolerance, within the operational range of an exemplary embodiment.

The term "sinusoidal" is meant to encompass not only pure sine and cosine waveforms, but also waveforms that are substantially or approximately sinusoidal, to a given tolerance, within the operational range of an exemplary embodiment. It will be appreciated that, in a given embodiment, the exact shape of the electric drive signal generated by the phase modulator driver can somewhat differ from that of an exact mathematical representation of a sine or cosine waveform, yet be sufficiently close to it to be considered as such for practical purposes.

The present description relates to optical phase modulation techniques for modulating a phase of an input light signal to produce a phase-modulated light signal modulated at a desired modulation frequency with reduced harmonic content. In accordance with various non-limiting aspects, the present description relates to a phase-modulating method; an optical phase modulator; an optical phase modulation device including an optical phase modulator and a phase modulator driver; and an optical phase modulation system including a light source assembly, an optical phase modulator, and a phase modulator driver.

In some implementations, the present techniques use a thermo-optic phase modulator configured to impart a phase shift that depends linearly on temperature to the input light signal. In such implementations, the present techniques involve electrically driving the thermo-optic phase modulator with a time-varying drive voltage or electric current, thereby generating heat by Joule effect to change the phase of the input light signal and output a phase-modulated light signal. In the present description, the expression "drive voltage or electric current" is sometimes shortened to "electric drive signal" for conciseness. Because Joule heating scales quadratically with an applied voltage or electric current, the phase shift imparted by the thermo-optic phase modulator varies linearly with the square of the electric drive signal, or equivalently, linearly with the electric power input supplied by the phase modulator driver. As described in greater detail below, in some implementations, obtaining a phase-modulated light signal modulated at a modulation frequency $f_m$ with reduced second harmonic content at $2f_m$, involves using an electric drive signal having a time-varying component oscillating at half the modulation frequency, $\frac{1}{2}f_m$, and no time-constant component, to account for the quadratic relationship between the phase shift imparted by the thermo-optic phase modulator and the electric drive signal applied thereto.

The present techniques can be useful in various applications where it is desirable or required to produce a phase-modulated light signal in which the second harmonic at twice the modulation frequency is suppressed or substantially reduced. For example, the present techniques can be implemented in a wide range of applications including, but not limited to, optical fiber communications; integrated photonics; fiber optic gyroscope sensors and other interferometric sensing techniques; lidar and other optical remote sensing techniques; active mode locking of lasers; and laser frequency stabilization.

Particularly, some embodiments of the present techniques can be implemented, at least partly, in a silicon-based or another high-index-contrast photonic platform including a plurality of planar optical waveguides provided in an integrated circuit configuration. It should be noted, however, that the present techniques are not limited to silicon photonics and other integrated photonics applications, and that they can be used in various other contexts, for example in optical fiber-based applications.

In the present description, the term "optical waveguide" or simply "waveguide" is used to refer to a device or structure that directs, constrains or guides electromagnetic radiation to flow along a light-guiding path defined by the waveguide. Non-limiting examples of optical waveguides include photonic waveguides, for example in planar lightwave circuits, optical fibers, and photonic crystals.

In the present description, the terms "light" and "optical" are used to refer to radiation in any appropriate region of the electromagnetic spectrum. The terms "light" and "optical" are therefore not limited to visible light, but can include, for example, the infrared wavelength range. For example, in some implementations, the light signal that is modulated can have wavelengths ranging from about 400 nanometers (nm) to about 2 micrometers (μm), although the present techniques may operate beyond this range.

Referring to FIG. 1, there is illustrated a schematic representation of a possible embodiment of an optical phase modulation system 20 in or with which some of the techniques disclosed herein can be implemented. The optical phase modulation system 20 is configured to modulate the phase of an input light signal 22 to produce a phase-modulated light signal 24 modulated at a modulation frequency with respect to the input light signal 22. In this embodiment, the optical phase modulation system 20 generally includes a light source assembly 26 configured to emit the input light signal 22, an input optical waveguide 28 receiving the input light signal 22 from the light source assembly 26; an optical phase modulator 30 receiving the input light signal 22 from the input optical waveguide 28; a phase modulator driver 32 configured to drive the optical phase modulator 30 with an electric drive signal 34, a drive voltage or electric current, to obtain the phase-modulated light signal 24 from the input light signal 22 passing through the optical phase modulator 30; and an output optical waveguide 36 receiving the phase-modulated light signal 24 exiting the optical phase modulator 30. The optical phase modulator 30 and the phase modulator driver 32 can define an optical phase modulation device 38. The configuration, functionality and operation of these and other possible components of the optical modulation system 20 will be described in greater detail below.

In some implementations, one or more components of the optical phase modulation system 20 may be part of a photonic integrated circuit, for example based on silicon-on-insulator (SOI) technology, and may be implemented in any appropriate type of planar waveguide structure. Non-limiting examples of planar waveguide structures include slab waveguides, strip waveguides, ridge waveguides, and rib waveguides. SOI technology refers to an integrated circuit technology that uses a layered silicon-insulator-silicon substrate rather than a conventional silicon substrate. The thin layer of silicon formed on top of the insulating layer, typically silica, can be patterned to define one or more waveguides, in accordance with a given circuit design. However, the present techniques are not limited to SOI technology but may be based on various other types of layered materials such as, for example, silicon nitride ($Si_3N_4$), silicon carbide (SiC), silicon oxynitride ($SiO_xN$), silicon oxide ($SiO_x$), indium phosphide (InP), gallium arsenide (GaAs), polymers and the like. The general principles underlying the structure and optical properties of SOI-based and other conventional integrated photonic circuits are known in the art and need not be covered in detail herein.

The light source assembly 26 can be embodied by any appropriate device or combination of devices adapted to generate an input light signal 22 which can be phase-modulated according to the present techniques to produce the phase-modulated light signal 24. Non-limiting examples of possible light sources can include a gas laser, a solid-state laser, a diode laser, a dye laser, a fiber laser, and a non-laser source such as a light-emitting diode. Depending on the application, the one or more light sources of the light source assembly 26 may be operated in a continuous-wave or pulsed regime. The choice and number of light sources can be dictated by various factors including, but not limited to, the operating wavelength, the peak power, the degree of coherence, the spatial and spectral profiles, the space requirements, and for a pulsed light source, the pulse characteristics. As noted above, in some embodiments, the light source assembly 26 can be configured to emit the input light signal 22 in a waveband ranging from about 400 nm to about 2 μm.

In SOI-based photonics implementations, the light source assembly 26 may be configured to deliver the input light signal 22 into the input optical waveguide 28 either indirectly (e.g., by transmitting light from an off-chip external laser source through an optical fiber, followed by the coupling of the fiber mode into the SOI waveguide) or directly (e.g., by hybrid/heterogeneous integration of III-V laser device/material on the silicon photonic integrated circuit platform, followed by the coupling of the laser mode into the SOI waveguide). Each of the indirect and direct coupling techniques can be further characterized by the employed coupling approach, such as edge-coupling, grating-coupling and evanescent-coupling. In either case, the input light signal 22 emitted by the light source assembly 26 may be coupled into the input optical waveguide 28 using an appropriate optical coupler, or coupling device or mechanism, schematically represented by reference character 40 in FIG. 1.

In the illustrated embodiment, the input optical waveguide 28 is depicted, for simplicity, as a single waveguiding structure that extends continuously between the optical coupler 40 and the optical phase modulator 30, but more complex waveguiding structures can also be used. For example, in some embodiments, the input optical waveguide 28 can include a plurality of waveguide sections coupled together by a variety of passive components (e.g., splitters, couplers, filters, and mode adapters) and/or active components (e.g., modulators, switches, and detectors).

In some implementations, the electric field of the input light signal 22 may have a sinusoidal time-dependent component represented by the expression:

$$E_i(t) = E_{i0} \sin(\omega_i t), \quad (1)$$

where $E_{i0}$ is the amplitude and $\omega_i = 2\pi f_i$ is the angular frequency, with $f_i$ the frequency. It should be noted that while the input light signal 22 in Equation (1) is assumed to be sinusoidal for simplicity, this is not meant to be limiting and non-sinusoidal signals may be used in other implementations.

The optical phase modulator 30 receives the input light signal 22 from the input optical waveguide 28. The optical phase modulator 30 is configured, upon being driven with the electric drive signal 34 applied by the phase modulator driver 32, to add a time-dependent phase shift or offset, $\phi_m(t)$, to the input light signal 22, and to produce the phase-modulated light signal 24 modulated at a desired modulation frequency $f_m$. In other words, the phase shift $\phi_m(t)$ is the time-dependent phase term that varies when imparting the phase modulation. If the input light signal 22 is given by Equation (1), the time-dependent component of the electric field of the phase-modulated light signal 24 may be expressed as:

$$E_m(t) = E_{i0} \sin[\omega_i t + \phi_m(t)], \quad (2)$$

where the phase shift $\phi_m(t)$ is time-varied at the desired modulation frequency $f_m$. In some implementations, the modulation frequency $f_m$ can range up to the gigahertz (GHz) frequency range. For example, when the optical phase modulator 30 is a thermo-optic phase shifter, the modulation frequency $f_m$ can range between 100 hertz (Hz) and 5 to 10 megahertz (MHz), particularly between 1 kilohertz (kHz) and 150 kHz. As described in greater detail below, the phase-shift $\phi_m(t)$ applied to the input light signal 22 through the optical phase modulator 30 can vary quadratically with the electric drive signal 34.

In general, the phase of a light wave is directly proportional to the optical path length traveled by the light wave. The optical path length is the product of the effective refractive index n of the medium in which the light travels times the physical length L of the path through the medium. Phase modulation techniques can rely on a change in either the refractive index (e.g., as in thermo-optic and electro-optic phase modulators) or the physical length (e.g., as in piezoelectric phase modulators) of the medium, or in both. In the former case, the phase shift $\phi_m$ resulting from a refractive index variation Δn, assumed spatially uniform across the length L of the medium for simplicity, may be expressed as:

$$\phi_m = \left(\frac{2\pi L}{\lambda_i}\right) \Delta n, \quad (3)$$

where $\lambda_i$ is the operating wavelength.

In some implementations, the optical phase modulator 30 is a thermo-optic phase shifter. The thermo-optic phase shifter can be configured to modulate the input light signal 22 based on a thermo-optic effect, in which a change in temperature results in a change in the refractive index of the optical guiding medium in which the input light signal travels as it passes through the thermo-optic phase shifter. It is noted that due to the strong thermo-optic coefficient, α, of silicon at typical telecommunication wavelengths and at room temperature, phase modulators based on the thermo-optic effect are commonly used in silicon-based photonics.

In the illustrated embodiment, the optical phase modulator 30 is a thermo-optic phase shifter that includes a modulating waveguide section 42 for supporting propagation of the input light signal 22 received from the input optical waveguide 28, and a resistive heater 44 in thermal contact with the modulating waveguide section 42, for example via one or more thermal bridges 46. For example, the modulating waveguide section 42 can be made of silicon, and the resistive heater 44 can be made of metal, doped semiconductor or another suitable conductive material. Upon being supplied with the electric drive signal 34, the resistive heater 44 generates heat 48, including by Joule heating. The heat 48 thus generated is transferred to the modulating waveguide section 42, changing its refractive index in accordance with a change in temperature and, in turn, the phase of the input light signal 22 propagating therealong to produce the phase-modulated light signal 24. Depending on the application, a variety of thermo-optic phase shifter configurations are known in the art and can be used to implement the optical phase modulation techniques disclosed herein. Non-limiting examples of thermo-optic phase shifter configurations include thermal phase shifters, thermal phase modulators, and metal heaters integrated in silicon photonics platforms.

Assuming that the refractive index n depends linearly, or nearly linearly, on temperature T, such that a change in temperature, ΔT, results in a directly proportional change in refractive index, Δn≡αΔT, where a is constant over ΔT, then the phase shift $\phi_m$ in Equation (3) can be written in terms of ΔT as follows:

$$\phi_m = \left(\frac{2\pi \alpha L}{\lambda_i}\right) \Delta T. \quad (4)$$

It should be noted that at least for relatively small temperature variations, the assumption of a linear relationship between refractive index and temperature generally holds in typical thermo-optical phase shifters used in silicon-based photonic circuits and silica-based optical fibers.

In the illustrated embodiment, since the heat 48 transferred to the modulating waveguide section 42 by the resistive heater 44 is generated predominantly by Joule heating, the temperature change experienced by the former is proportional to the square of the electric drive signal 34 supplied to the latter by the phase modulator driver 32, if the heat coupling efficiency between the resistive heater 44 and the modulating waveguide section 42 is sufficiently independent, or only weakly dependent, on temperature. In this case, assuming that the electric drive signal 34 is a drive voltage V or electric current I, Equation (4) can be expressed in terms of V and I as follows:

$$\phi_m = \left(\frac{2\pi\alpha L}{\lambda_i}\right)\frac{V^2}{Z_{th}}, \tag{5a}$$

$$\phi_m = \left(\frac{2\pi\alpha L}{\lambda_i}\right)Z_{th}I^2, \tag{5b}$$

where $Z_{th}$ is the impedance associated with the resistive heater 44, such that $\Delta T = V^2/Z_{th} = Z_{th}I^2$. Then, if the electric drive signal 34 is a time-varying modulation function, V(t) or I(t), Equation (2) may be expressed in terms of V(t) and I(t) as follows:

$$E_m(t) = E_{i0} \sin[\omega_i t + A_V V^2(t)], \tag{6a}$$

$$E_m(t) = E_{i0} \sin[\omega_i t + A_I I^2(t)], \tag{6b}$$

where $A_V = (2\pi\alpha L/\lambda_i Z_{th})$ and $A_I = (2\pi\alpha L Z_{th}/\lambda_i)$.

It is appreciated from Equations (5a)-(5b) and (6a)-(6b) that the phase shift $\phi_m$ applied to the input light signal 22 through the optical phase modulator 30 depends quadratically on the electric drive signal 34, V or I, supplied by the phase modulator driver 32. This quadratic relationship between $\phi_m$ and V or I may pose some challenges in applications where it is required or desirable that the phase modulation imposed by the optical phase modulator 30 be linearly proportional to the drive voltage or electric current and/or that the phase-modulated light signal 24 fulfill certain spectral purity requirements, for example related to the undesirable or deleterious presence of harmonics in the spectrum of the phase-modulated light signal 24 at integer multiples of the desired modulated frequency $f_m$, notably the second harmonic at $2f_m$. As such, the choice of the modulation waveform of the electric drive signal 34 applied to the optical phase modulator 30 by the phase modulator driver 32 may have an impact on the spectrum of the phase-modulated light signal.

For example, in some implementations, it may be required or desirable to produce a phase-modulated light signal 24 which is phase modulated sinusoidally at a desired modulation frequency $f_m$, by the optical phase modulator 30, as controlled by the electric drive signal 34, V(t) or I(t), applied by the phase modulator driver 32. In such a case, Equation (2) for the time-dependent component of the electric field of the phase-modulated light signal 24 may be expressed as:

$$E_m(t) \propto E_{i0} \sin[\omega_i t + \phi_{m0} \sin(\omega_m t)], \tag{7}$$

where $\omega_m = 2\pi f_m$ is the angular modulation frequency. To achieve such a sinusoidal phase modulation, a variety of time-domain modulation waveform could be used for the electric drive signal 34 applied by the phase modulator driver 32.

For example, one could consider generating the electric drive signal 34 as a unipolar drive voltage V(t) expressed as:

$$V(t) = V_0 + V_m(t) = V_0 + V_{m0}\sin(\omega_m t), \text{ with } V_0 > V_{m0}, \tag{8}$$

where $V_0$ is the time-constant, or direct current (dc), component of V(t), and $V_m = V_{m0}\sin(\omega_m t)$ is the time-varying, or alternating current (ac), component of V(t). Given that $V_0 > V_{m0}$, V(t) remains strictly positive, hence the designation "unipolar". The time-varying phase shift $\phi_m(t)$ imparted by this drive voltage can be found as follows:

$$\phi_m(t) = A_V V^2(t) \tag{9}$$

$$= [V_0 + V_{m0}\sin(\omega_m t)]^2$$

$$= A_V[V_0^2 + 2V_0 V_{m0}\sin(\omega_m t) + V_{m0}^2\sin^2(\omega_m t)]$$

$$= A_V\left\{V_0^2 + 2V_0 V_{m0}\sin(\omega_m t) + \frac{V_{m0}^2}{2}[1 - \cos(2\omega_m t)]\right\}$$

$$= A_V\left[\left(V_0^2 + \frac{V_{m0}^2}{2}\right) + 2V_0 V_{m0}\sin(\omega_m t) - \frac{V_{m0}^2}{2}\cos(2\omega_m t)\right].$$

Equation (9) indicates that the resulting time-varying phase shift $\phi_m(t)$ includes a time-constant component, $A_V(V_0^2 + \frac{1}{2}V_{m0}^2)$, a fundamental component, $2A_V V_0 V_{m0}\sin(\omega_m t)$, modulated at the desired modulation frequency $f_m$, and a second harmonic component, $-\frac{1}{2}A_V V_{m0}^2 \cos(2\omega_m t)$, at twice the modulation frequency, $2f_m$. In such a case, the ratio of the second harmonic component to the fundamental component is given by:

$$\left|\frac{\phi_m(2\omega_m)}{\phi_m(\omega_m)}\right| = \frac{V_{m0}}{4V_0} \tag{10}$$

which may not be negligible and may become adversely or undesirably large in some applications having more stringent requirements in terms of spectral purity or reduced harmonic content of the phase-modulated light signal.

The present techniques provide the electric drive signal 34 with a time-domain waveform having certain characteristics that aim to reduce the harmonic content, particularly the second harmonic, of a phase-modulated light signal 24 given by Equations (6a)-(6b), that is, a phase-modulated light signal 24 whose time-varying phase modulation function, $\phi_m(t)$, varies quadratically with a time-varying modulating drive voltage, V(t), or electric current, I(t). Particularly, in the disclosed embodiments, the electric drive signal 34, V(t), has a time-varying component, $V_m(t)$ or $I_m(t)$, oscillating at half the modulation frequency, $\frac{1}{2}f_m$, and no time-constant component, that is, $V_0 = 0$ and $I_0 = 0$. For example, in the case of a sinusoidal phase modulation, such a drive voltage V(t) may be written as:

$$V(t) = V_m(t) = V_{m0}\sin(\frac{1}{2}\omega_m t). \tag{11}$$

This type of electric drive signal 34 can be referred to as a bipolar drive voltage with zero dc offset, the designation "bipolar" reflecting the fact that the electric drive signal 34 includes both positive and negative voltage values.

The time-varying phase shift $\phi_m(t)$ imparted by the bipolar drive voltage of Equation (11) can be found as follows:

$$\phi_m(t) = A_V V^2(t) = A_V[V_{m0}\sin(\frac{1}{2}\omega_m t)]^2 = \frac{1}{2}A_V V_{m0}^2[1 - \cos(\omega_m t)]. \tag{12}$$

Figure 2:
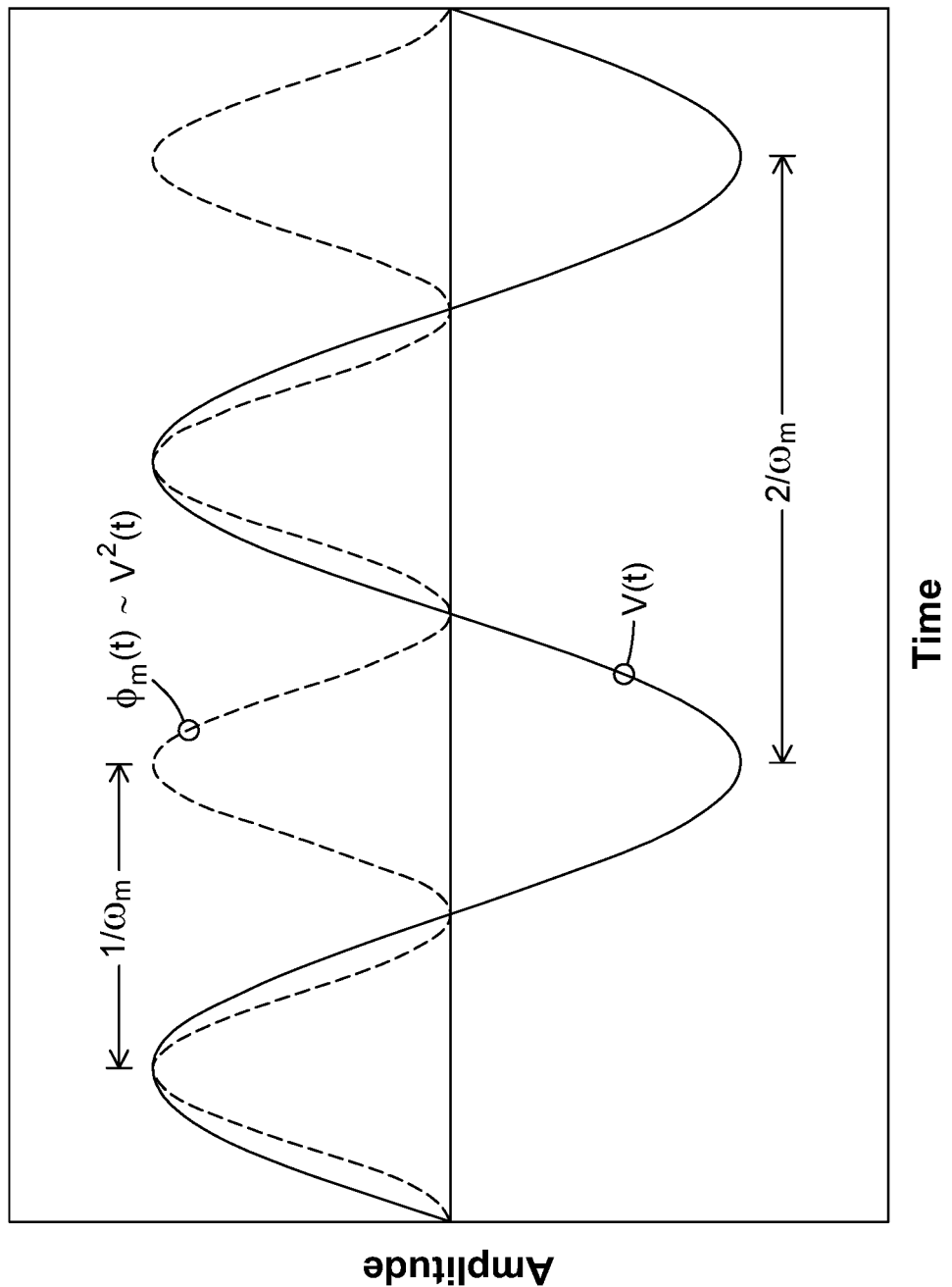
FIG. 2 is a calculated graph illustrating the time-dependent evolution of the drive voltage $V(t)=V_{m0}\sin(\frac{1}{2}\omega_m t)$ (solid curve) applied to an optical phase modulator by a phase modulator driver and the resulting phase shift $\phi_m(t)=A_V V^2(t)$ (dashed curve) imparted by the optical phase modulator to an input light signal as controlled by the drive voltage V(t), over two full periods of V(t), in accordance another possible embodiment. For simplicity, both curves are normalized to a common scale.

Referring to FIG. 2, there is provided a graph comparing how V(t) (solid curve) and $\phi_m(t)=A_V V^2(t)$ (dashed curve) vary as a function of time over two full periods of V(t). For simplicity, both curves are normalized to a common scale.

It can be appreciated from Equation (12) that the resulting time-varying phase shift $\phi_m(t)$ includes a time-constant component, $\frac{1}{2}A_V V_{m0}^2$, a fundamental component, $-\frac{1}{2}A_V V_{m0}^2 \cos(\omega_m t)$, modulated at the desired modulation frequency, but no second harmonic component. In such a case, the ratio of the second harmonic component to the fundamental component is given by:

$$\left|\frac{\phi_m(2\omega_m)}{\phi_m(\omega_m)}\right| = 0. \tag{13}$$

Figure 3A:
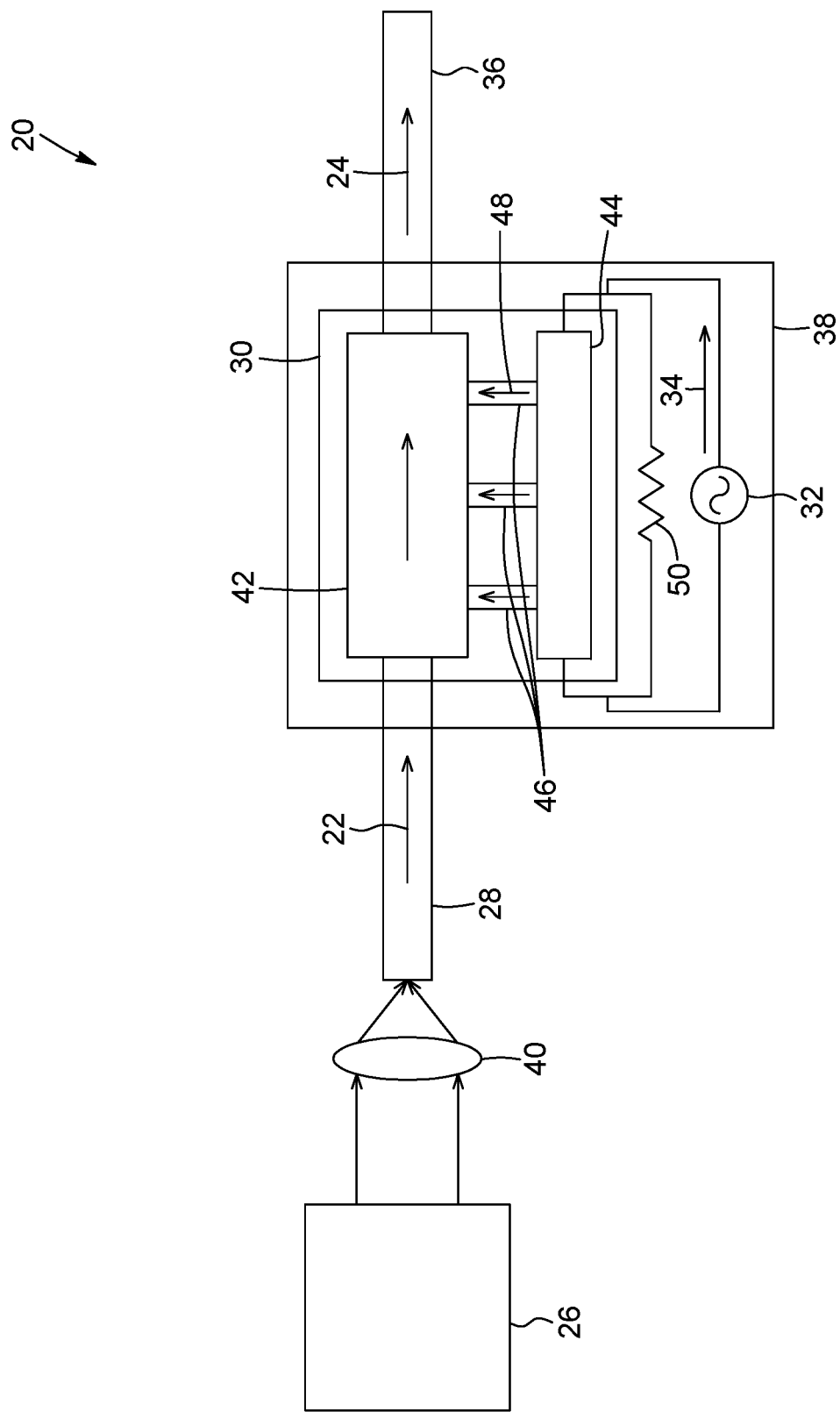
FIGS. 3A and 3B are schematic representations of an optical phase modulation system, in accordance with other possible embodiments.
Figure 3B:
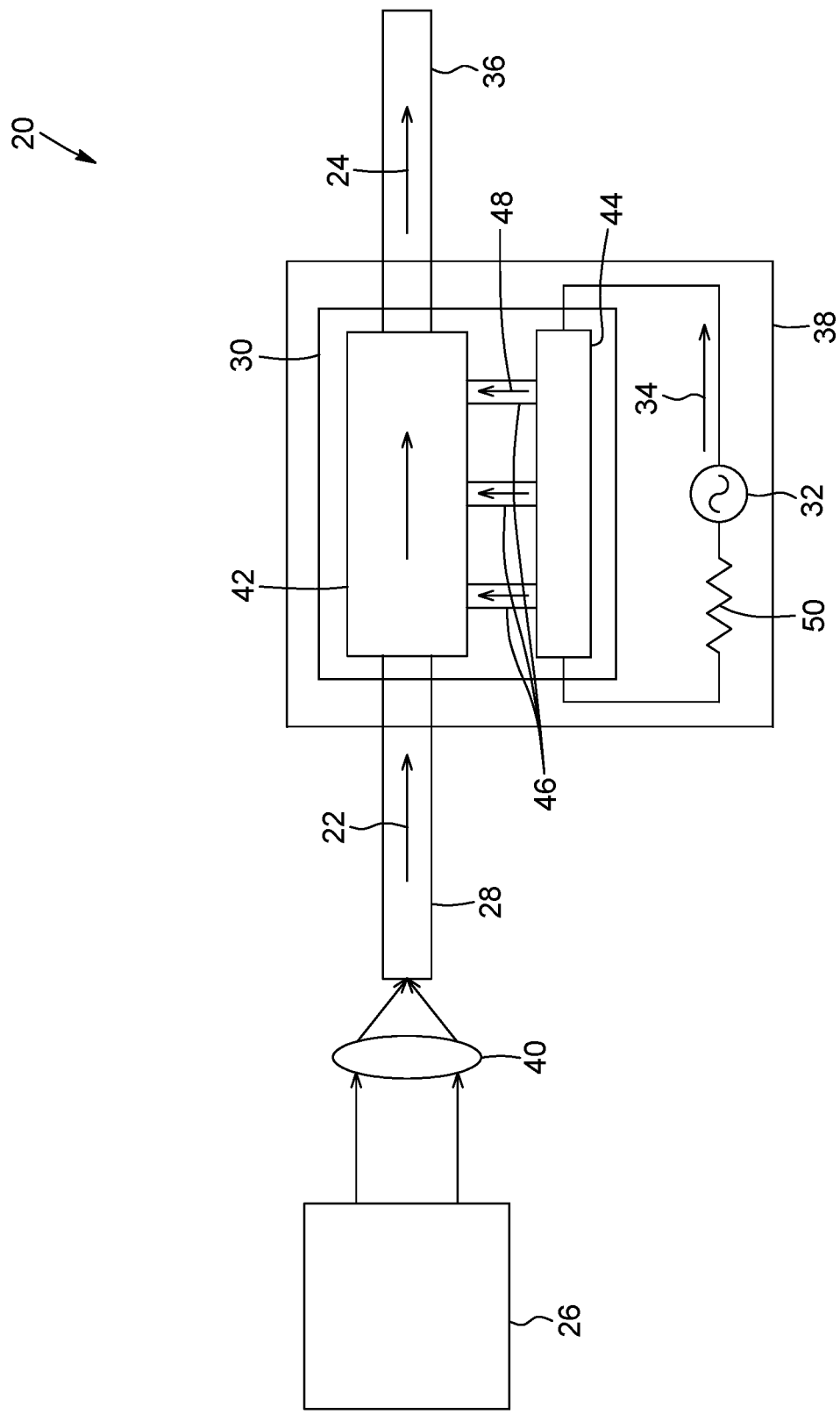

Equation (13) indicates that the phase modulation function $\phi_m(t)$ obtained according to Equation (12) will have, in theory, no second or higher-order harmonics. In practice, it is appreciated that the spectral purity of the phase modulation may be limited by the intrinsic nonlinearities of the optical phase modulator. These nonlinearities can be due to a nonuniform temperature distribution along the modulating waveguide section 42 resulting from a nonuniform heat transfer from the resistive heater 44. Additionally, or alternatively, these nonlinearities can result from the dependence between the temperature of the resistive heater 44 and the amplitude of the electric drive signal 34 deviating non-negligibly from a pure quadratic response, for example if the resistance of the resistive heater 44 varies as a function of temperature within its operating range. Referring to FIGS. 3A and 3B, in some implementations, deviations from a quadratic relationship between the temperature of the resistive heater 44 and the electric drive signal 34 can be mitigated by adding a component, for example another resistance 50, in parallel with the resistive heater 44 (FIG. 3A, where the electric drive signal 34 provided by the phase modulator driver 32 is an electric current) or in series with the resistive heater 44 (FIG. 3B, where the electric drive signal 34 provided by the phase modulator driver 32 is a voltage).

It should be noted that with respect to the electric drive signal applied by the phase modulator driver, the expression "oscillating at half the modulation frequency", and variants and derivative thereof, are meant to encompass not only "exactly" oscillating at half the modulation frequency, but also "generally", "substantially", "approximately", "nearly" or "sufficiently" oscillating at half the modulation frequency. Likewise, the expression "no time-constant component", and variants and derivative thereof, are meant to encompass not only "exactly" no time-constant component, but also "generally", "substantially", "approximately", "nearly" or "sufficiently" no time-constant component. The terms "oscillating at half the modulation frequency" and "no time-constant component" are therefore intended to cover scenarios where the electric drive signal can be considered to have a time-varying component that oscillates at half the desired modulation frequency and no time-constant component within tolerances that are acceptable for proper operation or application of a given exemplary embodiment.

Returning to FIG. 1, the phase modulator driver 32 may be embodied by any device or combination of devices adapted to drive the activation of the optical phase modulator 30 with an electric drive signal 34 having the desired characteristics, such as an ac component oscillating at half the desired modulation frequency and a null dc component. For example, the phase modulator driver 32 can include a crystal oscillator, a clock or another type of signal or waveform generator or source (either of voltage or current), and a combination of passive and active electronic components to form an amplification stage producing a sinusoidal modulation and a filter circuit to remove the dc component. Particularly, in the case of silicon photonics and other integrated photonics applications, the phase modulator driver 32 can be fully or partially integrated in the photonic integrated circuit containing the optical phase modulator 30 and the input and output optical waveguide 28, 36. In such a case, the phase modulator driver 32 can include one or more oscillators, transistors, resistors, inductors, or capacitors, or combinations thereof, to produce a purely ac electric drive signal. For example, in some implementations, the signal can be generated using a direct digital synthesizer or a microcontroller/digital signal processor combined with a digital-to-analog converter. Depending on the application, the electric drive signal can be generated using either digital (e.g., direct digital synthesis) or analog techniques. It should be noted that a variety of phase modulator drivers are known in the art, including for thermo-optic phase shifters integrated in silicon photonics platforms, and can be used to implement the techniques described herein.

By setting and adjustment of the electric drive signal 34, the phase modulator driver 32 provides control over the parameters of the phase modulation imposed on the input light signal 22 by the optical phase modulator 30, for example in terms of the desired modulation waveform, modulation frequency, and/or amplitude. In some implementations, the operation of the phase modulator driver 32 may be synchronized, fully or partly, with the operation of the light source assembly 26.

Returning to FIG. 1, the optical phase modulation system 20 includes an output optical waveguide 36 configured to receive the phase-modulated light signal 24 exiting the optical phase modulator 30 and to direct the phase-modulated light signal 24 away from the optical phase modulator 30 and toward its final destination where it can accomplish its intended function or purpose. As for the input optical waveguide 28, the output optical waveguide 36 is depicted in FIG. 1 as a single continuous waveguiding structure for simplicity. However, the output optical waveguide 36 can have a more complex structure and include a plurality of waveguide sections coupled together by a variety of passive and/or active components.

It should be noted that while the above-described examples are based on sinusoidal modulation time-domain waveforms, for simplicity, this is not meant to limit the scope of the present techniques, which can be implemented with a non-sinusoidal, periodic or nearly periodic, electric drive signals.

It should also be noted that while some implementations of the present techniques can be implemented with a thermo-optic phase modulator, other implementations could additionally or alternatively use another type of electrically drivable phase modulator whose phase modulation function depends linearly on the square of the drive voltage or electric current.

Figure 4:
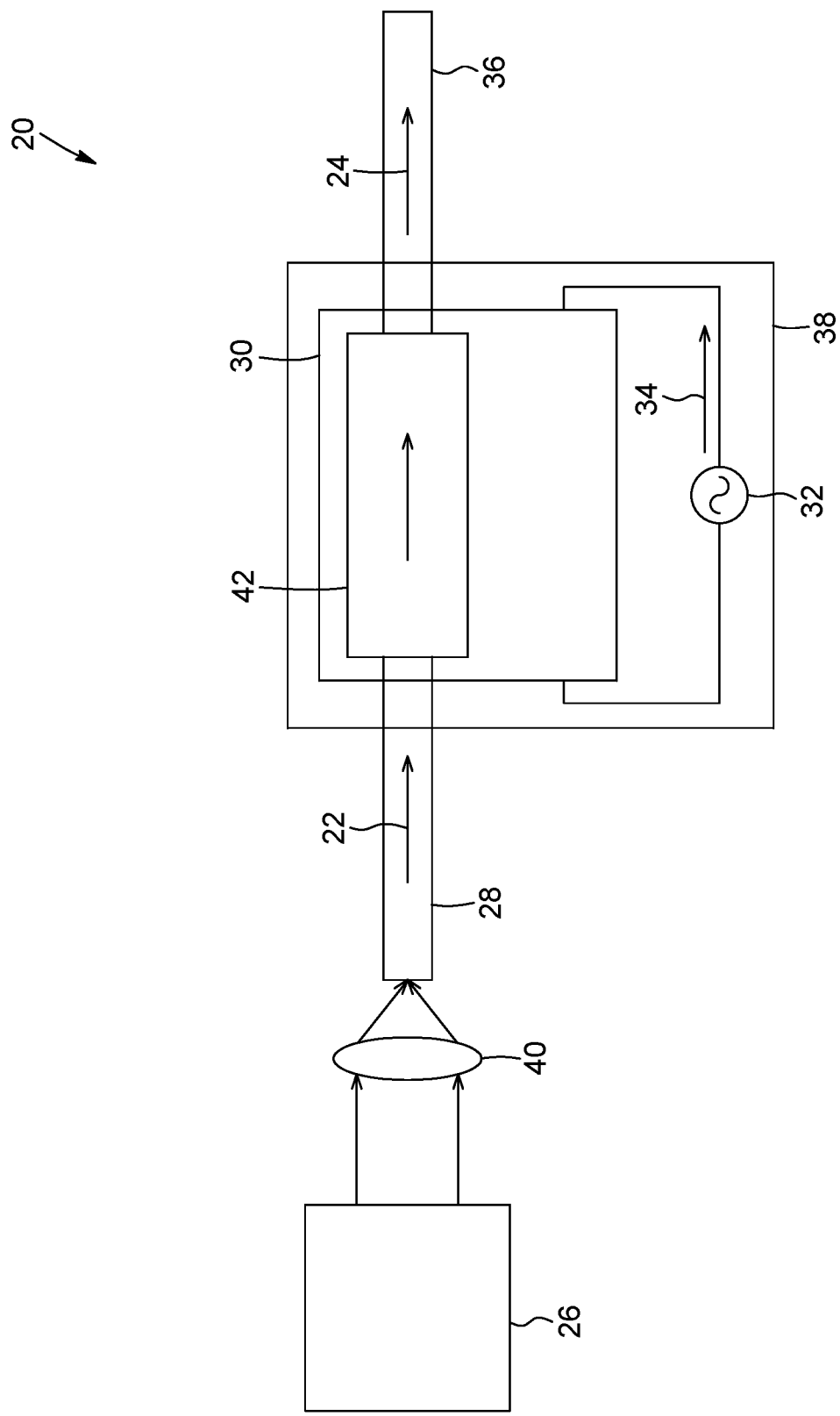
FIG. 4 is a schematic representation of an optical phase modulation system, in accordance with another possible embodiment.

For example, referring to FIG. 4, there is illustrated a schematic representation of another embodiment of an optical phase modulation system 20 configured to modulate the phase of an input light signal 22 to produce a phase-modulated light signal 24 modulated at a modulation frequency with respect to the input light signal 22. As the embodiment of FIG. 1, the optical phase modulation system 20 of FIG. 4 generally includes a light source assembly 26 configured to emit the input light signal 22, an input optical waveguide 28 receiving the input light signal 22 from the light source assembly 26; an optical phase modulator 30 receiving the input light signal 22 from the input optical waveguide 28 along a modulating waveguide section 42; a phase modulator driver 32 configured to drive the optical phase modulator 30 with an electric drive signal 34 to obtain the phase-modulated light signal 24 from the input light signal 22 passing through the optical phase modulator 30; and an output optical waveguide 36 receiving the phase-modulated light signal 24 exiting the optical phase modulator 30. The optical phase modulator 30 and the phase modulator driver 32 can define an optical phase modulation device 38. In contrast to FIG. 1, the optical phase modulator 30 in FIG. 4 is embodied by an electro-optic phase shifter configured to modulate the input light signal 22 based on a quadratic electro-optic effect, for example the Kerr electro-optic effect, according to which a change in the refractive index of the optical guiding medium in which the input light signal 22 travels as it passes through the thermo-optic phase shifter is proportional to the square of an applied electric field (i.e., the square of the electric drive signal 34). As described above, in FIG. 4, the optical phase modulator 30 and the phase modulator driver 32 can define an optical phase modulation device 38.

Figure 5:
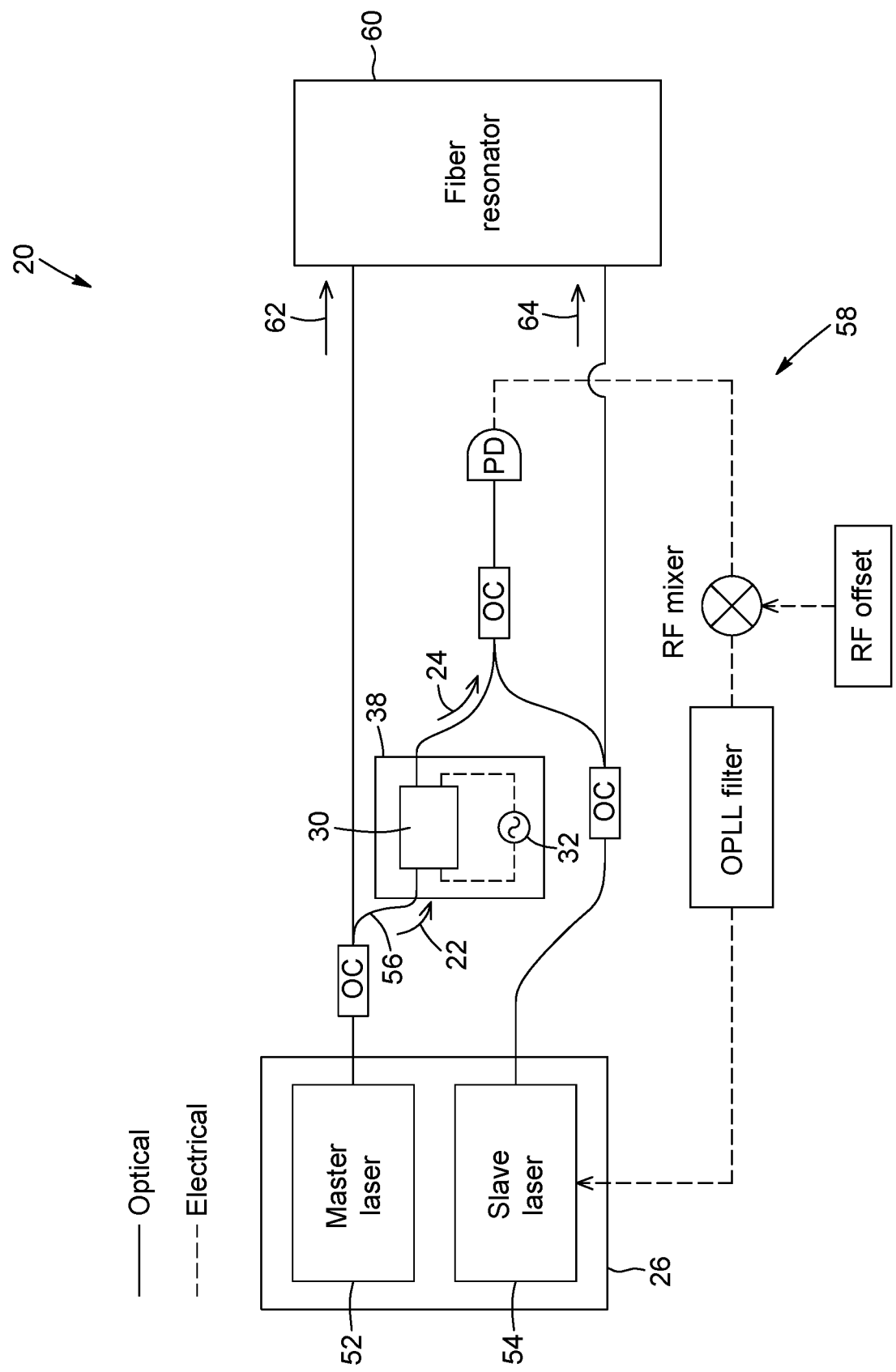
FIG. 5 is a schematic representation of an optical phase modulation system, in accordance with another possible embodiment. In this embodiment, the optical phase modulation system includes a multifrequency laser source assembly having a master laser and a slave laser, and an optical phase modulation device including an optical phase modulator and a phase modulator driver. The master laser is configured to emit the input light signal received by the optical phase modulator and the slave laser is responsive to the phase-modulated light signal produced by the optical phase modulator through an optical phase-locked loop (OPLL) associated with the slave laser. The optical phase modulation system also includes a fiber resonator in optical communication with the master laser and the slave laser.

Referring to FIG. 5, there is illustrated a schematic representation of an optical phase modulation system 20, in accordance with another possible embodiment in which the system 20 is implemented as a resonator fiber optic gyroscope (RFOG) system. In this embodiment, the RFOG system 20 includes a multifrequency laser source assembly 26 having a master laser 52 and a slave laser 54. Other implementations may include more than one slave laser, for example two or three slave lasers.

The system 20 of FIG. 5 also includes an optical phase modulation device 38 having an optical phase modulator 30 and a phase modulator driver 32, such as described above. The optical phase modulation device 38 is provided in an optical path 56 (e.g., an optical fiber) along which a portion of the light signal from the master laser 52 is distributed to an optical phase-locked loop (OPLL) 58 associated with the slave laser 54. The optical phase modulation device 38 is configured to modulate a signal provided to the slave laser 54 via the OPLL 58, in view of locking the slave laser 54 to the master laser 52 at a frequency and phase offset therebetween. More specifically, the optical phase modulation device 38 receives, as an input light signal 22, a portion of the light signal emitted by the master laser 52, and outputs a phase-modulated light signal 24. An optical coupler (OC) combines the phase-modulated light signal 24 with a portion of the light signal emitted by the slave laser 54. This combined light signal is transmitted through an optical fiber to a photodetector (PD), for example a photodiode, which converts the combined light signal into an electric signal. This electric signal is then mixed down with a radio frequency (RF) offset signal using an RF mixer. The frequency and phase of the RF signal controls the frequency and phase offset at which the slave laser 54 is locked to the master laser 52. The RF mixer acts as a phase detector whose purpose is to generate an error signal proportional to the phase difference between the electric signal from the PD and the RF signal. The phase error signal is filtered by an OPLL filter and used to tune the slave laser 54. As a result, the output of the slave laser 54 is modulated based on the phase-modulated light signal 24 produced by the optical phase modulation device 38 through the OPLL 58, such that the phase modulation imparted to the portion of the output of the master laser 52 by the optical phase modulation device 38 is applied to output of the slave laser 54.

The system 20 further includes a fiber resonator 60 in optical communication with the master laser 52 and the slave laser 54. The fiber resonator 60 is configured to receive, in a first direction, a signal 62 originating from the master laser 52 and, in a second direction opposite the first direction, a modulated signal 64 from the slave laser 54. From these counterpropagating signals 62, 64, the fiber resonator 60 is configured to generate, based on the Sagnac effect, an error signal allowing discrimination of a frequency detuning between the frequency of the slave laser 54 and a resonance frequency of the fiber resonator 60.

It is appreciated that RFOG systems, notably using master-slave laser setups, are generally known in the art, and need not be described in greater detail herein. Reference can be made, for example, to U.S. Pat. No. 8,923,352 B2 and U.S. Pat. No. 9,587,945 B2, the entire contents of which are incorporated herein by reference.

Figure 6:
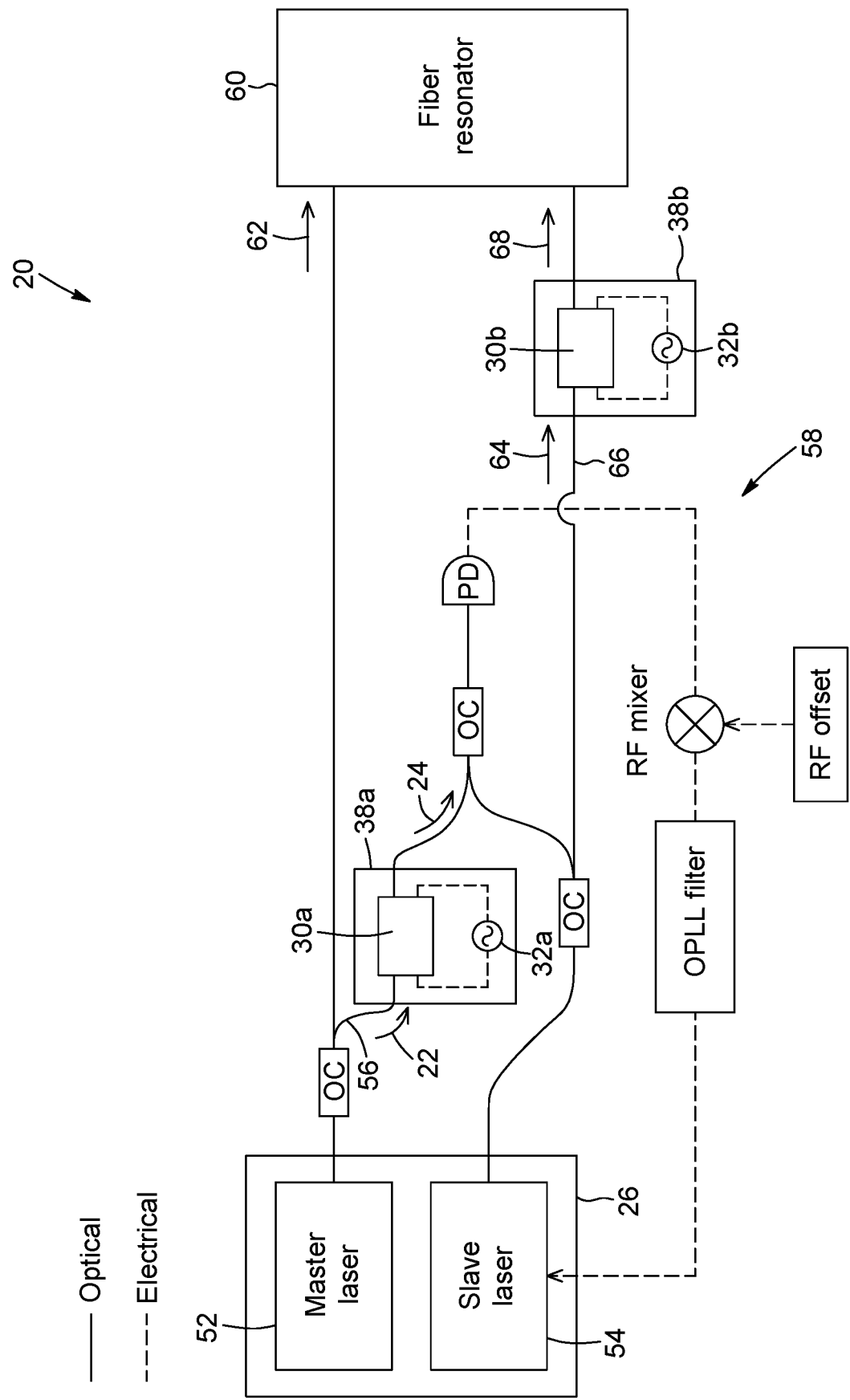
FIG. 6 is a schematic representation of an optical phase modulation system, in accordance with another possible embodiment. In this embodiment, the optical phase modulation system includes a multifrequency laser source assembly having a master laser and a slave laser, and two optical phase modulation devices.

Referring to FIG. 6, there is illustrated another embodiment of an optical phase modulation system 20 implemented as an RFOG system. This embodiment shares many features with the embodiment described with reference to FIG. 5, notably in that it generally includes a multifrequency laser source assembly 26 having a master laser 52 and a slave laser 54; a first optical phase modulation device 38a having an optical phase modulator 30a and a phase modulator driver 32a; and a fiber resonator 60. As in FIG. 5, the first optical phase modulation device 38a is provided in a path 56 used to distribute the output signal from the master laser 52 to the OPLL 58 associated with the slave laser 54.

The system 20 of FIG. 6 differs from that of FIG. 5 notably in that it includes a second optical phase modulation device 38b disposed in a path 66 (e.g., an optical fiber) to receive the modulated signal 64 produced by the slave laser 54 prior to the modulated signal 64 reaching the fiber resonator 60. The second optical phase modulation device 38b can include an optical phase modulator 30b and a phase modulator driver 32b, such as described above. The second optical phase modulation device 38b is configured to receive the modulated signal 64 from the slave laser 54 and impart thereto a phase modulation to produce another modulated signal 68. This modulated signal 68 and the signal 62 originating from the master laser 52 is be used as counter-propagating signals for interrogating the fiber resonator 60. The provision of the second optical phase modulation device 38b can allow modulating the output of the slave laser 54 independently of the modulation imparted by the first optical phase modulation device 38a by phase-locking to the master laser 52. This possibility can be advantageous in master-slave laser systems that include a plurality of slave lasers. Indeed, in such a case, each slave laser can be phase-locked to the master laser in accordance with the phase modulation imparted to the master laser output, and then be individually modulated by its own phase modulator.

Of course, numerous modifications could be made to the embodiments described above without departing from the scope of the appended claims.

The invention claimed is:

1. An optical phase modulation system, comprising:
   a light source assembly configured to emit an input light signal;
   an optical phase modulator comprising:
      a modulating waveguide section for receiving and supporting propagation of the input light signal, the modulating waveguide section having an effective refractive index that depends linearly on temperature; and a resistive heater in thermal contact with the modulating waveguide section; and a phase modulator driver configured to apply a drive voltage or electric current having a time-varying component oscillating at half the modulation frequency and no time-constant component to the resistive heater to generate heat that is transferred into the modulating waveguide section, thereby changing the effective refractive index, and in turn, the phase of the input light signal propagating therealong to produce a phase-modulated light signal modulated at the modulation frequency.

2. The optical phase modulation system of claim 1, wherein the optical phase modulation system is part of a photonic integrated circuit.

3. The optical phase modulation system of claim 1, wherein modulating waveguide section comprises silicon.

4. The optical phase modulation system of claim 1, wherein the light source assembly is configured to emit the input light signal in a waveband ranging from about 400 nanometers to about 2 micrometers.

5. The optical phase modulation system of claim 1, wherein the light source assembly is a multifrequency laser source assembly comprising a master laser and one or more slave lasers, one of the master laser and the one or more slave lasers being configured to emit the input light signal received by the optical phase modulator.

6. The optical phase modulation system of claim 5, further comprising a fiber resonator in optical communication with the multifrequency laser source assembly.

7. The optical phase modulation system of claim 5, wherein the master laser is configured to emit the input light signal received by the optical phase modulator, and wherein an output of the slave laser is modulated based on the phase-modulated light signal produced by the optical phase modulator through an optical phase-locked loop.

8. The optical phase modulation system of claim 1, wherein the phase modulator driver is configured to impart a sinusoidal time-domain waveform to the drive voltage or electric current.

9. The optical phase modulation system of claim 1, wherein the modulation frequency ranges from about 100 hertz to about 10 megahertz.

10. An optical phase modulation device for modulating a phase of an input light signal at a modulation frequency, the optical phase modulation device comprising:
an optical phase modulator configured to receive and impart a phase shift to the input light signal, the phase shift varying quadratically with an applied drive voltage or electric current; and
a phase modulator driver configured to apply the drive voltage or electric current to the optical phase modulator as an electric drive signal having a time-varying component oscillating at half the modulation frequency and no time-constant component, thereby imparting the phase shift, modulated at the modulation frequency, to the phase of the input light signal to produce a phase-modulated light signal.

11. The optical phase modulation device of claim 10, wherein the optical phase modulator is a thermo-optic phase shifter or an electro-optic phase shifter.

12. The optical phase modulation device of claim 10, wherein the phase modulator driver is configured to impart a sinusoidal time-domain waveform to the drive voltage or electric current.

13. The optical phase modulation device of claim 10, wherein the input light signal lies in a waveband ranging from about 400 nanometers to about 2 micrometers.

14. An optical phase modulation device for modulating a phase of an input light signal at a modulation frequency, the optical phase modulation device comprising:
an optical phase modulator comprising:
a modulating waveguide section for receiving and supporting propagation of the input light signal, the modulating waveguide section having an effective refractive index that depends linearly on temperature; and
a resistive heater in thermal contact with the modulating waveguide section; and
a phase modulator driver configured to apply a drive voltage or electric current having a time-varying component oscillating at half the modulation frequency and no time-constant component to the resistive heater to generate heat that is transferred into the modulating waveguide section, thereby changing the effective refractive index, and in turn, the phase of the input light signal propagating therealong to produce a phase-modulated light signal modulated at the modulation frequency.

15. The optical phase modulation device of claim 14, wherein the modulation frequency ranges from about 100 hertz to about 10 megahertz.

16. The optical phase modulation device of claim 14, wherein the modulating waveguide section is a planar waveguide structure.

17. The optical phase modulation device of claim 14, wherein the modulating waveguide section comprises silicon.

18. The optical phase modulation device of claim 14, wherein the phase modulator driver is configured to impart a sinusoidal time-domain waveform to the drive voltage or electric current.

19. A method of modulating a phase of an input light signal at a modulation frequency, the method comprising:
receiving the input light signal in an optical phase modulator configured to impart a phase shift to the input light signal, the phase shift varying quadratically with an applied drive voltage or electric current; and
applying the drive voltage or electric current to the optical phase modulator as an electric drive signal, the electric drive signal having a time-varying component oscillating at half the modulation frequency and no time-constant component, thereby imparting the phase shift, modulated at the modulation frequency, to the phase of the input light signal to produce a phase-modulated light signal.

20. The method of claim 19, further comprising emitting the input light signal with a master laser or a slave laser of multifrequency laser source assembly.

21. The method of claim 19, further comprising emitting the input light signal in a waveband ranging from about 400 nanometers to about 2 micrometers.

22. The method of claim 19, wherein the optical phase modulator is configured to operate according to a thermo-optic effect or an electro-optic effect.

23. The method of claim 19, wherein the optical phase modulator comprises a modulating waveguide section for supporting propagation of the input light signal, the modulating waveguide section having an effective refractive index that depends linearly on temperature, and a resistive heater in thermal contact with the modulating waveguide section, and wherein applying the drive voltage or electric current to the optical phase modulator comprises applying the drive voltage or electric current to the resistive to generate heat, thereby changing the effective refractive index of the modulating waveguide section to impart the phase shift to the input light signal.

24. The method of claim 23, wherein the modulating waveguide section comprises silicon.

25. The method of claim 19, wherein applying a drive voltage or electric current comprises imparting a sinusoidal time-domain waveform to the drive voltage or electric current.

26. The method of claim 19, wherein the modulation frequency ranges from about 100 hertz to about 10 megahertz.

* * * * *